(12) United States Patent
Knapke et al.

(10) Patent No.: US 11,975,282 B2
(45) Date of Patent: May 7, 2024

(54) FILTER FOR PURIFYING AN AIR STREAM

(71) Applicant: GUILD ASSOCIATES INC., Dublin, OH (US)

(72) Inventors: Michael J. Knapke, Plain City, OH (US); Joseph A. Rossin, Columbus, OH (US); Mark Noltimier, Columbus, OH (US)

(73) Assignee: GUILD ASSOCIATES INC., Dublin, OH (US)

( * ) Notice: Subject to any disclaimer, the term of this patent is extended or adjusted under 35 U.S.C. 154(b) by 308 days.

(21) Appl. No.: 17/087,292

(22) Filed: Nov. 2, 2020

(65) Prior Publication Data

US 2021/0129063 A1    May 6, 2021

Related U.S. Application Data

(60) Provisional application No. 62/929,206, filed on Nov. 1, 2019.

(51) Int. Cl.
  *B01D 46/00*    (2022.01)
  *B01D 46/12*    (2022.01)
  (Continued)

(52) U.S. Cl.
  CPC ..... *B01D 46/0043* (2013.01); *B01D 46/0036* (2013.01); *B01D 46/12* (2013.01);
  (Continued)

(58) Field of Classification Search
  CPC ............ B01D 46/0036; B01D 46/0043; B01D 46/12; B01D 46/58; B01D 53/0407;
  (Continued)

(56) References Cited

U.S. PATENT DOCUMENTS 3,873,287 A * 3/1975 Barnebey ........... B01D 46/0013
                                                    96/139
5,030,423 A * 7/1991 Obee ........................ F24F 8/10
                                                    422/4

(Continued)

FOREIGN PATENT DOCUMENTS

KR          101800630 B1 * 11/2017 ............. B01D 46/12
WO     WO-2007143041 A2 * 12/2007 ......... B01D 53/0423

OTHER PUBLICATIONS

KR101800630B1_ENG (Espacenet machine translation of Hee) (Year: 2017).*

*Primary Examiner* — Gabriel E Gitman
(74) *Attorney, Agent, or Firm* — Slayden Grubert Beard PLLC

(57) ABSTRACT

A filter is provided for removing contaminants from a gas flow (e.g., an air flow). Multiple panel filters are arranged in a filter housing. The panel filters are arranged parallel or near-parallel to a main gas flow direction and spaced apart to define elongated gas flow channels between adjacent panel filters, each elongated gas flow channel extending generally in the gas flow direction. The elongated gas flow channels include inlet channel(s) and outlet channel(a) arranged in an alternating manner, the inlet channel(s) configured receiving the gas flow at the inlet end and the outlet channel(s) outputting a filtered gas flow from the outlet end. Gas flow redirecting structures are arranged to redirect the gas flow in each inlet channel through adjacent panel filter(s) and into adjacent outlet channel(s). The filter may provide a pressure drop of less than 3 iwg, less than 1 iwg, or less than 0.3 iwg.

21 Claims, 9 Drawing Sheets

(51) Int. Cl.
*B01D 46/121* (2022.01)
*B01D 46/58* (2022.01)
*B01D 53/50* (2006.01)
*B01D 53/58* (2006.01)

(52) U.S. Cl.
CPC .......... *B01D 46/58* (2022.01); *B01D 53/508* (2013.01); *B01D 53/58* (2013.01); *B01D 46/121* (2022.01); *B01D 2253/102* (2013.01); *B01D 2267/30* (2013.01); *B01D 2277/10* (2013.01); *B01D 2277/20* (2013.01)

(58) Field of Classification Search
CPC ................. B01D 53/508; B01D 53/58; B01D 2253/102; B01D 2267/30; B01D 2277/10; B01D 2277/20; B01D 2257/93; B01D 2259/4508; B01D 2259/4566; B01D 2259/4583; B01D 46/121; F24F 3/16; F24F 8/10; F24F 8/108
See application file for complete search history.

(56) References Cited

U.S. PATENT DOCUMENTS

| | | | | |
|---|---|---|---|---|
| 5,512,074 A * | 4/1996 | Hanni | ................. | B01D 46/58 |
| | | | | 55/497 |
| 7,055,314 B2 * | 6/2006 | Treiber | ................. | F01N 3/0231 |
| | | | | 60/297 |
| 2004/0149130 A1 * | 8/2004 | Gorchev | ............. | B01D 46/121 |
| | | | | 95/268 |
| 2008/0017038 A1 * | 1/2008 | Wu | ........................ | B32B 27/32 |
| | | | | 96/154 |

* cited by examiner

FILTER FOR PURIFYING AN AIR STREAM

RELATED APPLICATION

This application claims priority to commonly owned U.S. Provisional Patent Application No. 62/929,206 filed Nov. 1, 2019, the entire contents of which are hereby incorporated by reference for all purposes.

TECHNICAL FIELD

The present disclosure relates to filters, and more particular, to filters for removing contaminants from a gas flow, e.g., an air stream.

BACKGROUND

Collective protection (CP) filters are used to provide breathable air in confined spaces in various types of installations, for example, shelters, buildings, mobile structures, and ships. CP filters differ from respirator or cartridge filters in that CP filters are typically operated on a continuous or near continuous basis and designed to protect personnel located in a confined space. CP filters are generally designed to remove toxic and/or other hazardous chemicals, for example, traditional chemical warfare (CW) agents, toxic industrial chemicals (TICs), and/or hazardous air pollutants (HAPs) from air, thereby providing safe breathable air to personnel in a chemically contaminated environment. Examples of CW agents include hydrogen cyanide, cyanogen chloride, sarin, soman, chlorine, phosgene and chemical agent VX. Examples of TICs include ammonia, ethylene oxide, fuming nitric acid, nitrogen oxides, formaldehyde and methyl bromide. Examples of HAPs include benzene, toluene, perchloroethylene, methylene chloride and dioxin. CP filters are often designed to treat large volumes of air entering confined spaces. For example, CP filters may be designed to treat air volumes at a rate of about 10 standard cubic feet per minute (SCFM) to greater than about 1,000 SCFM, and in some cases, greater than about 20,000 SCFM. The air volume or rate of air treatment is often dependent upon the volume of the confined space or multiple spaces being treated collectively.

Conventional CP filters employ filtration media engineered to remove toxic and/or hazardous chemicals from streams of air. As used herein, filtration media is defined as any material capable of removing toxic and/or hazardous chemicals from air over a range of ambient temperatures and relative humidities by either physical adsorption, chemical reaction or a combination thereof. Examples of filtration media include activated carbon, zeolites, activated carbon impregnated with metal salts, and porous metal oxides impregnated with potassium permanganate. CP filters can employ a single filtration media, a mixture of filtration media, or layers of dissimilar filtration media. The filtration media may be selected depending upon the toxic and/or hazardous chemicals targeted for removal by the CP filter. For example, military CP filters often contain activated carbon impregnated with salts of copper, zinc and silver, plus triethylene diamine, to provide protection against CW agents and selected TICs.

To be effective, the CP filter is configured such that the toxic and/or hazardous chemical-containing air stream contacts the filtration media. It is typically advantageous to minimize the pressure drop across the bed of filtration media to reduce capital and operating costs associated with the air purification system, particularly for continuously operated CP filters.

Most CP filters utilize either a fixed bed filter or a radial flow filter. The fixed bed filter includes a vessel containing filtration media. Although simple in design, the fixed bed filter often experiences an excessive pressure drop, for example a pressure drop of 10 inches of water gauge pressure (iwg), due to the filter bed depth required to achieve the target contact time. In addition, fixed beds are typically not modular, preventing replacement of the filtration media.

The radial flow filter was developed as an improvement to the fixed bed filter, for example by achieving a lower pressure drop than the fixed bed filter design. One example of a radial flow filter is the M98 filter employed in military CP applications, The radial flow filter includes a cylindrical housing including an annular bed filled with filtration media. Air flow enters the cylindrical housing in a radial direction, passes through the annular bed of filtration media, and exits in a radial direction, such that the air flow makes a 90 degree turn within the filter.

Although generally effective, the radial flow filter has known deficiencies. For example, the radial flow filter reduces the pressure drop compared to the traditional fixed bed filter, but still experiences a pressure drop of about 4-5 iwg. Traditional air handling systems are typically limited to a pressure drop of about 2 iwg or less (preferably below 1 iwg). As a result, incorporating a conventional radial flow filter into a CP application may require substantial changes to the system infrastructure, which may be cost prohibitive.

Another drawback relates to the geometry of the radial flow filter. The filter bed consist of an annulus filled with filtration media; however, the media contained in the annulus typically occupies about 20% or less of the volume of the filter including the exit plenum. Thus, the radial flow filter offers a reduced pressure drop relative to the fixed bed filter, but at the expense of greatly increasing the filter volume. In addition, the conventional radial flow filter is difficult to manufacture, and the filter elements are difficult to effectively fill with media to avoid settling of the media over time, which creates an internal leak path.

Thus, there is a need for an improved filter and filtering process for purifying air contaminated with toxic and/or hazardous chemicals.

SUMMARY

Embodiments of the present invention relate to a novel low pressure drop filter for removing toxic and/or hazardous chemicals, such as chemical warfare (CW) agents, toxic industrial chemicals (TICs) and hazardous air pollutants (HAPs) from streams of air. Embodiments of the disclosed filter are configured for contacting the toxic and/or hazardous chemical-laden air stream with a reactive adsorbent at or near ambient temperature in a manner such that a low pressure drop (less than 3 inches of water gauge) is achieved. The low pressure drop achieved by the disclosed filter may involve using panel filters (each including one or more panel filter elements) oriented in a parallel flow or near-parallel (slight angle) flow configuration. The filter element arrangements described herein provide a high geometric (frontal) surface area over which the flow is distributed while reducing the depth of the filter media bed. The combination of high geometric surface area and reduced bed thickness allows for achieving low pressure drops relative to traditional filter configurations such as filter banks and radial flow filters. The low pressure drop allows the disclosed filter to be integrated into existing air handling systems associated with buildings, ships, shelters and mobile structures without upgrading the air handling system to accommodate the high pressure drop associated with traditional air purification systems.

Some embodiments of the disclosed filter include panel filters (each including one or more panel filter elements) arranged in a parallel or near-parallel flow configuration. Such configuration may provide improved utilization of the filtration media within the filter volume while achieving a low pressure drop, such as less than 3 iwg, preferably less than 1 iwg and more preferably less than 0.3 iwg. The low pressure drop and improved utilization of the filtration media allows the present invention to be integrated into existing air handling systems without upgrading the infrastructure. Said feature offers a low cost, compatible system capable of achieving requirements for purification of air contaminated with toxic and/or hazardous chemicals. An additional feature of the parallel/near-parallel flow panel filter configuration is that the elements are simple to manufacture and can be readily designed to incorporate layers of dissimilar filtration media to provide broad spectrum chemical protection.

The disclosed filter can be employed in a range of configurations whereby the number of elements can be varied from as few as two to as many as 10 or more. The length, height and thickness of the elements can be varied as needed to meet the volume and pressure drop constraints of the application. The filter may be designed such that the residence time; i.e. the time in which the flow stream is in contact with the media, is sufficient to achieve the desired level of air purification. As such, the residence time can range from as little as less than 0.01 seconds to as much as 1 second or more.

The panel filters (each including one or more panel filter elements) can be configured linear to the flow direction; however, adding a slight angle to the elements, such as up to about 7 degrees or more, so that the opening at the entrance to the elements is greater than the distance at the end of the elements (referenced along the direction of flow) may be preferred.

The spacing between the panel filters may be as little as 1/10th or less the thickness of each panel filter to greater than twice the thickness of each panel filter. In some embodiments it may be desired to minimize the space between the panel filters due to volume constraints of the application.

Filtration media can be retained within the panel filters using techniques known to one skilled in the art. Panel filters can be constructed using a variety of materials and designs that allow for retaining the filtration media, plus provide seals between the panel filters and the housing to eliminate flow by-passing. For example, each panel filter may include one or multiple panel filter elements, wherein each panel filter element may comprise a rectangular prism with screens (referred to as bed supports) on the front and back faces and sealed along the perimeter edges, and having a size/volume suitable to support the relevant filtration media. The filtration media is then contained within the resulting volume. Gaskets may be provided (e.g., on the panel element or on the housing) to form a seal between the perimeter edges of each panel filter and the housing. In another example, the filtration media is immobilized in a polymeric webbing, with layers of the polymeric webbing stacked one on top of the other to form panel filter elements. The edges of the media-loaded webbing may be potted and gasketed to allow the element to be loaded into the parallel/near-parallel flow housing.

A wide range of filtration media may be employed to remove the targeted toxic and/or hazardous chemicals (e.g. CW agents, TICs and HAPs) from air. Examples of media include activated carbon, activated alumina, silicon dioxide, impregnated activated carbon, metal oxides, resins and impregnated metal oxides.

The disclosed filter may be employed in a variety of applications and configurations where a low pressure drop and/or low volume solution to air purification is required or advantageous. One example of an application includes arranging the filter in duct work to provide purified air to a room or series of rooms. Another example of an application involves arranging the filter upstream or downstream of an existing air handling system so that breathable air may be provided to the entire building or confined space. Still another application involves arranging the filter in a stand-alone configuration to provide breathable air to a portable shelter, for example.

One aspect provides a filter for removing contaminants from a gas flow. The filter includes a filter housing extending along a main gas flow direction from an inlet end to an outlet end of the filter. A plurality of panel filters are arranged in the filter housing, wherein the plurality of panel filters are parallel or near-parallel to the main gas flow direction and spaced apart from each other to define a plurality of elongated gas flow channels extending generally in the main gas flow direction. The plurality of elongated gas flow channels include at least one inlet channel arranged in an alternating manner with at least one outlet channel, the at least one inlet channel configured to receive the gas flow at the inlet end of the filter and the at least one outlet channel configured to output a filtered gas flow from the outlet end of the filter. The filter also includes at least one gas flow redirecting structure configured to redirect the gas flow in each inlet channel through at least one panel filter and into at least one adjacent outlet channel.

In one embodiment, each panel filter include includes multiple types of media contained in a panel filter housing.

In one embodiment, each panel filter include includes at least two panel filter elements stacked side-by-side. The at least two panel filter elements of each panel filter may include different filtering media or otherwise differ from each other.

In one embodiment, the at least one gas flow redirecting structure includes at least one gas flow blocking structure configured to fully block the gas flow through each inlet channel.

In one embodiment, the gas flow redirecting structures include the at least one gas flow redirecting structure includes (a) a gas flow blocking structure at a downstream end of each inlet channel and configured to fully block the gas flow through the downstream end of the inlet channel; and (b) a gas obstructing structure arranged in each inlet channel at a location upstream of the gas flow blocking structure at the downstream end of the respective inlet channel, wherein the gas flow obstructing structure in each inlet channel is configured to redirect a first portion of the gas flow in the respective inlet channel through at least one adjacent panel filter and allow a second portion of the gas flow to pass toward the downstream end of the respective inlet channel.

In one embodiment, each panel filter is arranged parallel to the main gas flow direction.

In one embodiment, each panel filter is arranged non-parallel but at an angle of less than 7 degrees relative to the main gas flow direction. In one embodiment, each panel filter is arranged non-parallel but at an angle of less than 5 degrees relative to the main gas flow direction. In one embodiment, each panel filter is arranged non-parallel but at an angle of less than 2 degrees relative to the main gas flow direction.

In one embodiment, an adjacent pair of the panel filters are arranged near-parallel to the main gas flow direction such that a respective inlet channel defined between the pair of panel filters has a width that decreases from the inlet end of the filter to the outlet end of the filter.

In one embodiment, the filter includes an integrated blower.

In one embodiment, at least one of the panel filters includes activated carbon, e.g., activated, impregnated carbon.

In one embodiment, the filter provides a pressure drop of the gas flow of less than 3 iwg (inches of water gauge pressure), preferably less than 2 iwg, more preferably less than 1 iwg, more preferably less than 0.3 iwg.

In one embodiment, a thickness of each panel filter, in a direction perpendicular to the main gas flow direction, is less than or equal to 3 inches, preferably less than or equal to 1 inch.

In one embodiment, the panel filters are constructed such that a residence time of the gas flow through each panel filter element is between 0.01 seconds and 1 second, preferably between 0.1 and 0.3 seconds.

In one embodiment, each panel filter comprises an integrated high efficiency particulate air (HEPA) filter.

In one embodiment, the gas flow comprises an air flow, and the filter is configured to remove contaminants select from the group consisting of traditional chemical warfare (CW) agents, toxic industrial chemicals (TICs), and hazardous air pollutants (HAPs).

BRIEF DESCRIPTION OF THE FIGURES

Example aspects of the present disclosure are described below in conjunction with the figures, in which.

DETAILED DESCRIPTION

The present invention relates to a filter for removing toxic and/or hazardous chemicals (e.g. CW agents, TICs and HAPs) from a gas flow, e.g., an air flow. Examples of toxic and/or hazardous chemicals include CW agents such as chlorine, phosgene, hydrogen cyanide, arsine, cyanogen chloride, sarin, soman and nerve agent VX. Examples of TICs include sulfur dioxide, oxides of nitrogen, fuming nitric acid, ethylene oxide, ammonia, formaldehyde and methyl bromide. Examples of HAPs include benzene, toluene, perchloroethylene, methylene chloride and dioxin. Toxic and/or hazardous chemicals are removed from air by contacting the air stream with filtration media configured according to the disclosed filter in a manner such that a high removal efficiency is realized while achieving a low pressure drop, such as less than 3 iwg, preferably less than 1 iwg and more preferably less than 0.3 iwg. The low pressure drop is achieved by configuring the filtration media in multiple panel filter elements, with the panel filter elements arranged parallel/near-parallel to the flow direction. The novel configuration achieves the low pressure drop by creating a high geometric surface area over which the process stream is distributed.

Figure 5:
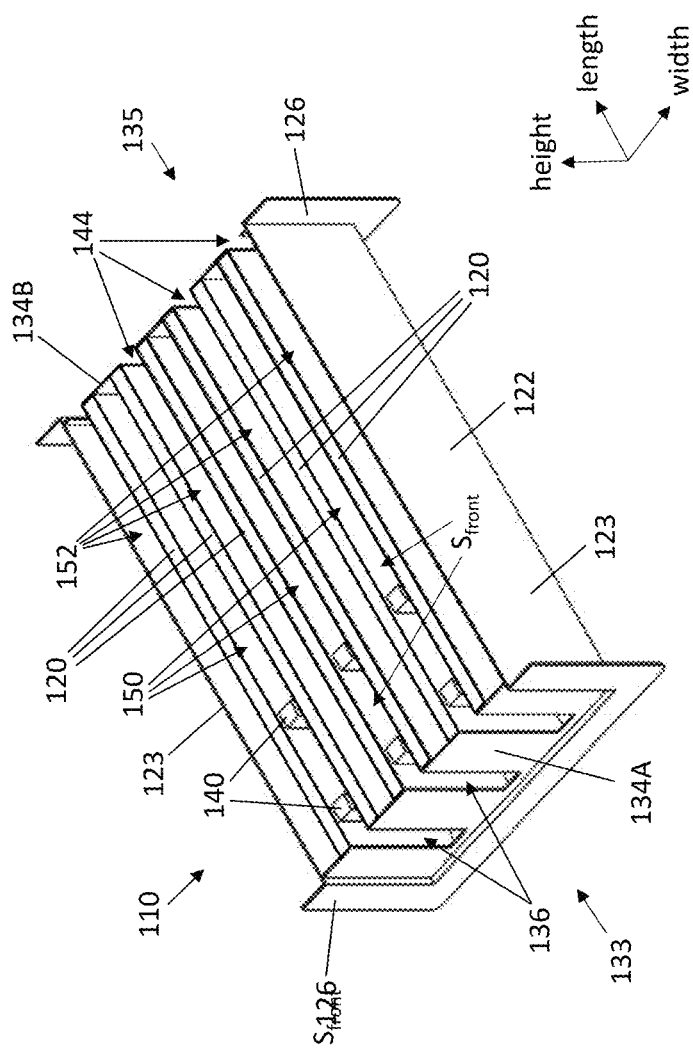
FIG. 5 is a three-dimensional cross-sectional view of the filter of FIG. 2, through cut lines 5-5 shown in FIG. 2, showing internal structures of the filter, according to one example embodiment of the invention.
Figure 6:
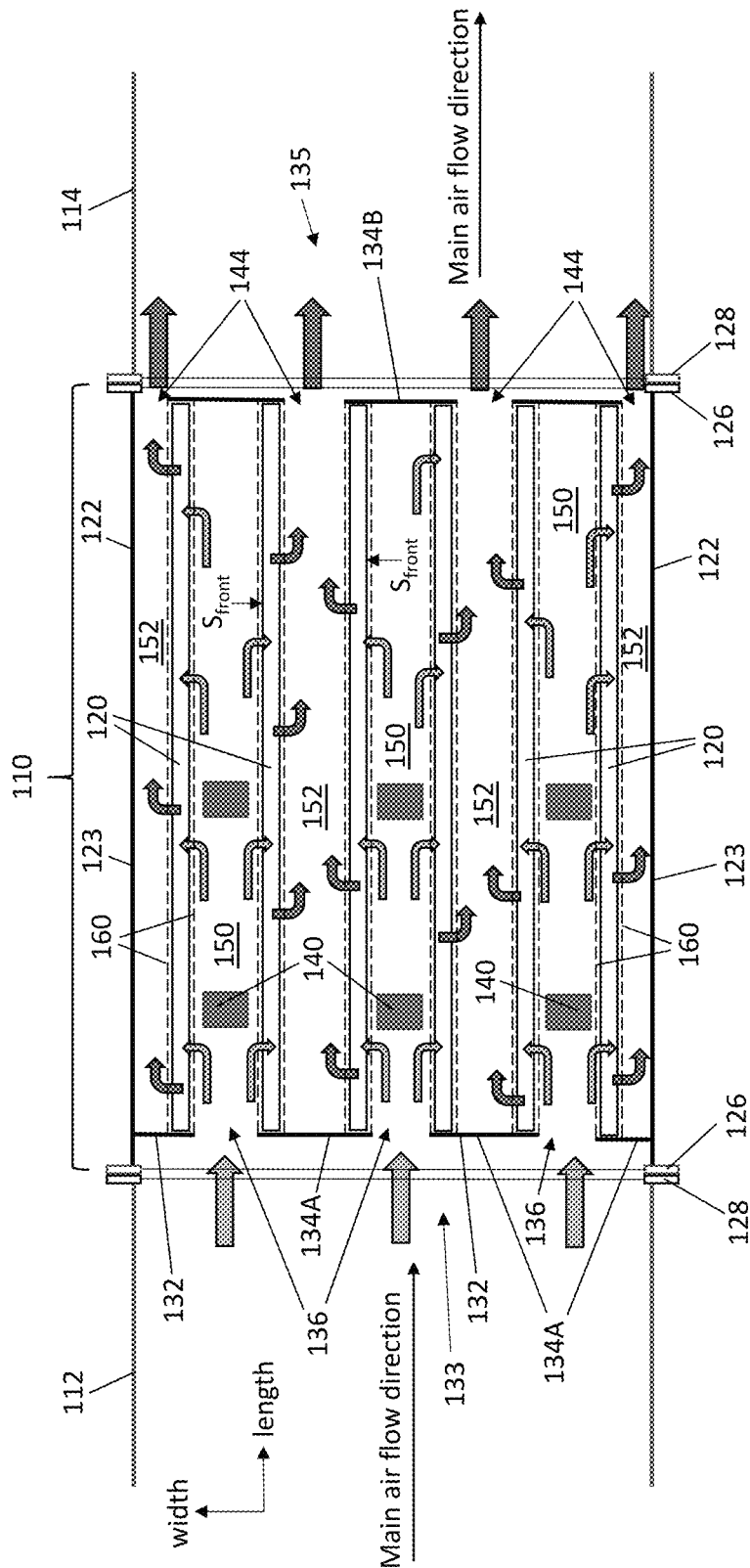
FIG. 6 shows a top view of the filter, showing air flow along inlet channels, redirected laterally through panel filters and into adjacent outlet channels, and out through the outlet end of the filter, according to one example embodiment of the invention.
Figure 7:
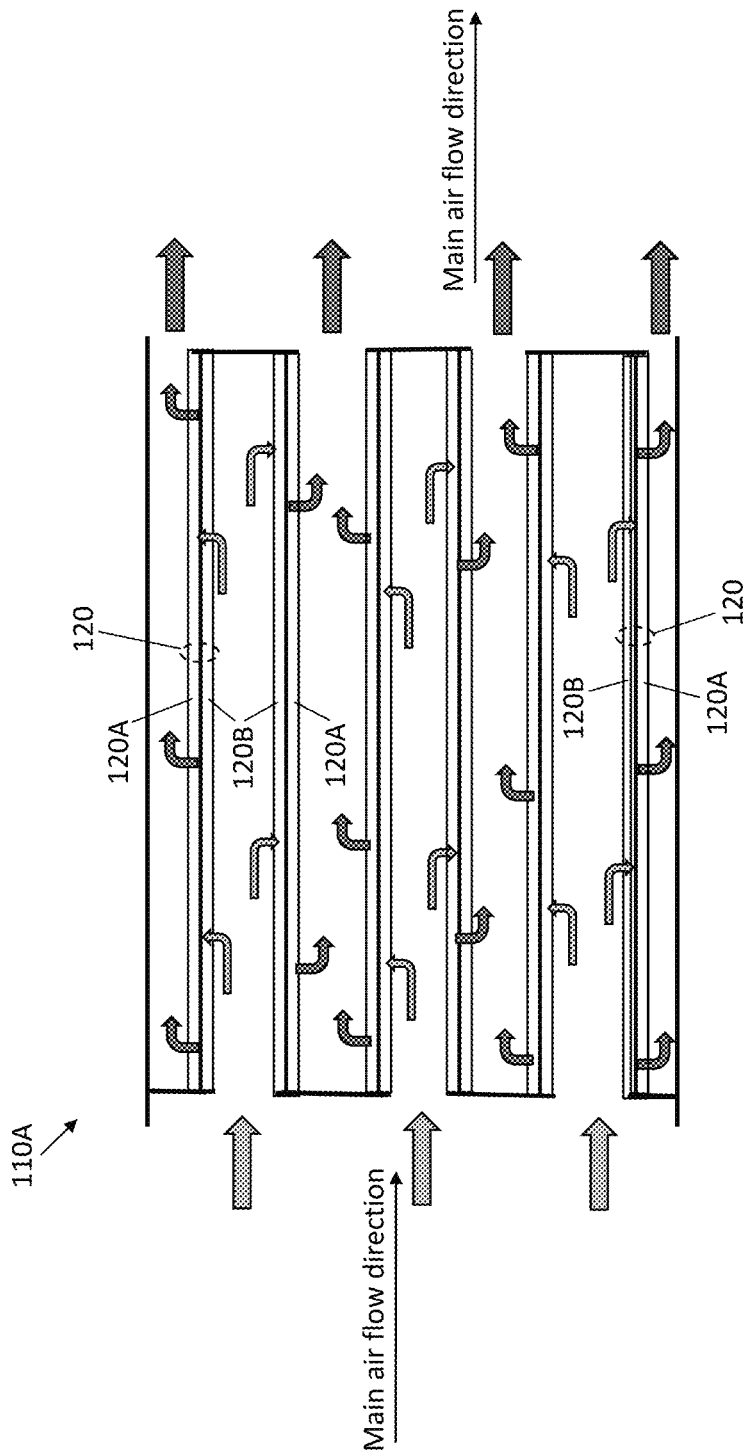
FIG. 7 shows a top view of another embodiment of the filter, in which each panel filter includes a stack of multiple different panel filter elements, according to one example embodiment of the invention.
Figure 8:
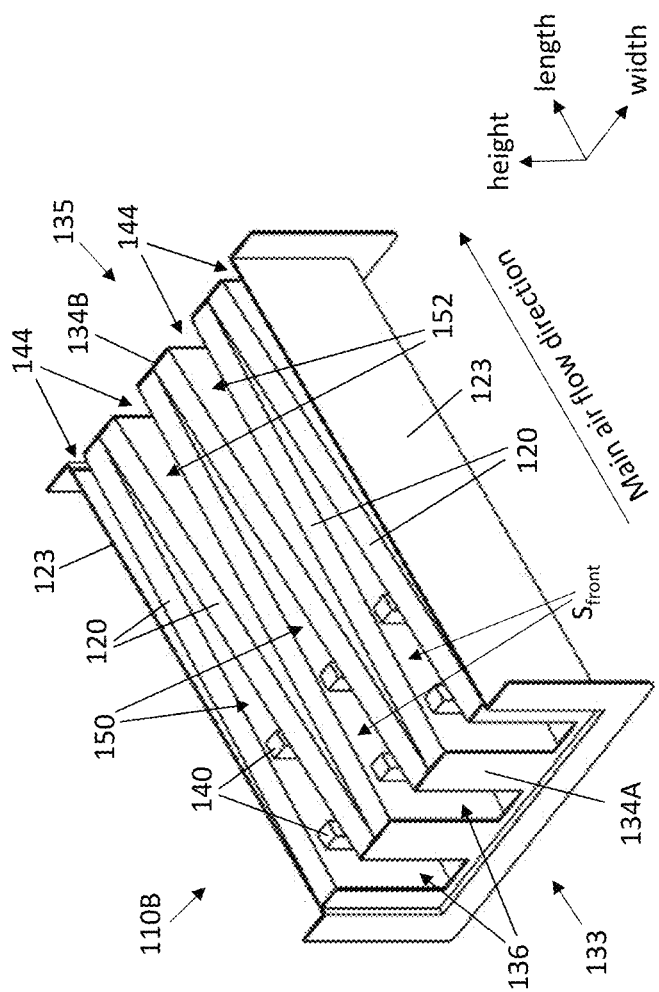
FIG. 8 is a three-dimensional cross-sectional view of the filter of FIG. 2, through cut lines 5-5 shown in FIG. 2, showing internal structures of the filter, wherein the panel filters are arranged at offset angles to define tapered air flow channels, according to one example embodiment of the invention.
Figure 9:
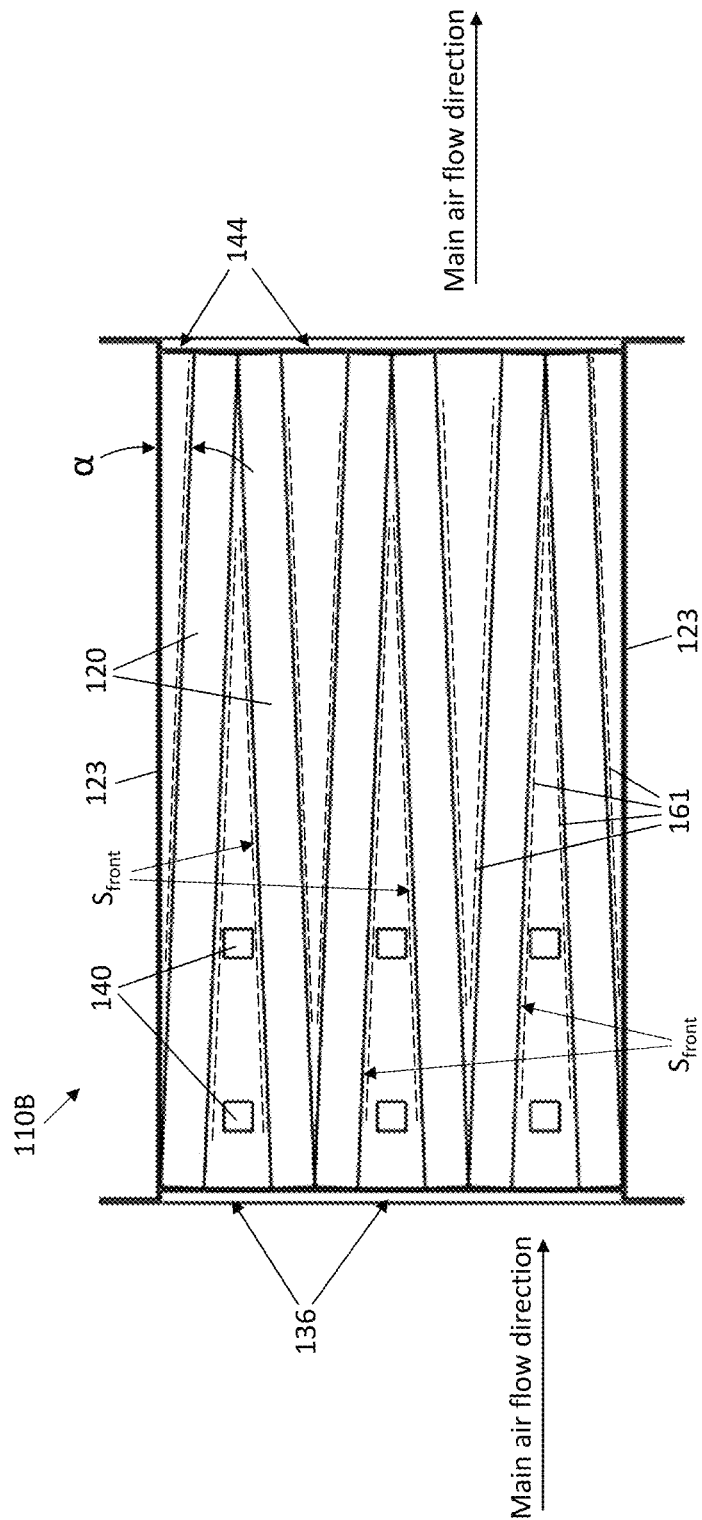
FIG. 9 shows a top view of the example filter shown in FIG. 8, according to one example embodiment of the invention.

Some embodiments of the disclosed filter may include two or more panel filters arranged in a parallel flow configuration, e.g., as illustrated in FIGS. 5-7 discussed below. Alternatively, e.g., as illustrated in FIGS. 8-9 discussed below, the panel filters may be arranged near-parallel to the main air flow direction, e.g., with a slight angle relative to the main air flow direction, for example with an angular offset of less than 2 degrees, less than 5 degrees, or less than 7 degrees relative to the main air flow direction.

As used herein, a panel filter is "parallel" to the main air flow direction and/or to a sidewall of the filter housing extending along the main air flow direction, if a frontal surface plane of the panel filter is parallel to the main air flow direction (or filter housing sidewall), e.g., to within 0.5 degree or 1 degree. A panel filter is "near-parallel" to the main air flow direction, or to a filter housing sidewall extending along the main air flow direction, if a frontal surface plane of the panel filter is arranged non-parallel but offset from the main air flow direction (or filter housing sidewall) by less than a defined degree of angular offset, e.g., less than 7 degrees, less than 5 degrees, or less than 2 degrees, depending on the particular embodiment. The frontal surface plane of a panel filter (indicated as $S_{front}$ in the drawings) is the plane of the major surface of the panel filter through which the air flow is redirected (i.e., through the filter bed thickness). In some embodiments, the angular alignment of each panel filter (e.g., parallel or near-parallel to the main air flow direction and/or filter housing sidewall) may be defined by a slot, rail, or other alignment structure configured to hold the panel filter in a defined position.

In some embodiments, every other (alternating) air flow channel between adjacent pairs of panel filters is closed at the filter inlet, allowing the process stream to enter the filter between every other (alternating) pair of panel filters. Alternative openings are closed at the exit of the flow stream. Such configuration causes the flow, traveling along the main air flow direction to the panel filter, to turn (e.g., right angle turn) and pass through the panel filter element, resulting in contact between the flow stream and the filtration media contained within the filter. Contact between the contaminated process stream and the filtration media contained within the panel filter may act to remove a least a portion of the toxic and/or hazardous chemicals contained in the process stream. After passing through the panel filter, the flow stream makes another right angle turn and is again flowing along the main air flow direction and out through the outlet end of the filter housing. Each panel filter may be produced in a manner so that the pressure drop through each panel filter is consistent. In this manner, the contaminated flow stream may be evenly distributed among the panel filters.

The use of two or more panel filters may define a high geometric (frontal) surface area, for example many times greater than of a traditional fixed bed adsorber or that of a radial flow filter containing a similar amount of filtration media. The high geometric surface area coupled with the reduce thickness of the filter beds may allow the filter to achieve a low pressure drop, for example less than 3 iwg, preferably less than 1 iwg and more preferably less than 0.3 iwg. The design of filters that target the removal of toxic and/or hazardous chemicals from air are based on the residence time of the flow through the bed of filtration media. For a residence time of 0.5 seconds and a flow rate of 200 SCFM, a volume of filtration media on the order of 1.7 ft$^3$ may be needed to meet the target air purification capabilities of the filter.

In a conventional filter, for a single bed of filtration media employed in an opening 10 inches tall and 14 inches wide, the bed depth would typically be greater than 20 inches and the pressure drop, estimated at greater than 150 iwg (approximately 6 psig), would be excessive. The excessive pressure drop is due to the low geometric (frontal) surface area (slightly less than 1 ft2) of the opening. In contrast, embodiments of filter described herein include panel filters arranged parallel or near-parallel to the main air flow direction to takes advantage of length of the panel filters. For example, employing two parallel flow panel filters 10 inches tall and 48 inches long (along the air flow direction) will create a geometric surface area on the order of 6.7 ft$^2$ with the same volume of filtration media contained in the two, 3 inch deep panel filter elements. The increase in geometric surface area coupled with the decrease in bed depth may decrease the pressure drop through the panel filter elements to less than 2.5 iwg. In another example, employing four parallel flow panel filter elements 10 inches tall and 36 inches long defines a geometric surface area on the order of 10 ft$^2$ with an element depth of 2 inches. The increase in geometric surface area coupled with the decrease in bed depth will decrease the pressure drop through the element to less than an estimated 1 iwg.

Embodiments of disclosed filter may include at least two and as many as 10 or more panel filters (e.g., including one or multiple filter elements) and may be used to remove toxic and/or hazardous compounds from air streams over a wide range of process conditions. For example, the flow rate of air can be as low as less than 10 SCFM to as high as greater than 20,000 SCFM. In some embodiments the filter can be operated at temperatures as low as less than 32° F. to as high as greater than 120° F. Further, in some embodiments the residence time of the process stream can be in the range of 0.01 seconds to 1 second, or in some embodiments above 1 second In some embodiments the filter may be designed to integrate into a variety of applications. For example, the filter can be designed to fit into household or structure duct work and achieve a pressure drop less than 3 iwg, preferably less than 1 iwg and more preferably less than 0.3 iwg without modifications to the existing air handling system. In some embodiments the filter may be used to provide breathable air to a specific room, specific rooms or areas within the household or structure. In another example, the filter can be designed with a pressure drop less than 1 iwg and preferably less than 0.3 iwg to deliver purified air to a mobile unit such as a vehicle, ship or tent using a low-powered air mover such as a fan. In still another example, the filter can be designed to be directly integrated into the existing air handling system associated with a household, building or ship, thereby delivering purified air to the entire structure while achieving a pressure drop less than 3 iwg, preferably less than 1 iwg and more preferably less than 0.3 iwg. In another example, the filter may also include a dust and/or particulate filter, such as a high efficiency particulate air (HEPA) filter.

Each panel filter may include one or multiple panel filter elements having a rectangular prism shape designed to promote contact between the process stream and the filtration media. Each panel filter element may include screens on the front and back, and may be sealed along the perimeter sides, with filtration media is contained within the volume of the rectangular prism. The purpose of the screens is to retain the filtration media and allow the air flow to pass. Scrim material, such as felt, may be included on the interior of the screens. Gasket material may be provided on the outside perimeter of each panel filer element to seal the panel filter element with the filter housing. Alternatively, the panel filer elements may be permanently adhered to the housing. The length and width of the panel filter element can vary greatly depending on the flow rate of air being processed and on the geometry of the space claim. In some embodiments the bed depth of each panel filter (which may include one or multiple panel filter element), i.e., the thickness perpendicular to the frontal surface $S_{front}$, may be less than or equal to 3 inches, less than or equal to 3 inches, or preferably less than or equal to 1 inch, depending on the particular embodiment or application.

In another example, the filtration media may be immobilized in a polymeric webbing, with layers of the polymeric webbing stacked one on top of the other to form a panel filter element. The use of polymeric webbing may be provided, for example, for applications where the bed depth of filtration media is less than about 1" thick. The polymeric webbing can be polyester, polyethylene or poly propylene, for example.

The filtration media contained within each panel filter can vary widely depending upon the target application. Mixtures or layers of dissimilar filtration media may also be employed. The specific filtration media employed in the filter may depend on the nature of the toxic and or hazardous compounds that are desired to be removed from the process stream. Examples of adsorptive filtration media include activated carbon, aluminum oxides, silicon dioxides and resins. Examples of reactive filtration media include, for example, (1) activated carbon impregnated with salts of copper, zinc, silver, iron, chromium, cobalt, molybdenum, triethylene diamine, or mixtures thereof, (2) zirconium hydroxide loaded with oxides and hydroxides of copper, zinc, cobalt, iron, silver or chromium, or mixtures thereof, (4) aluminum oxide, zirconium hydroxide, activated carbon or silicon dioxide impregnated with silver, potassium permanganate (KMnO4), or mixtures there of (5) activated carbon, aluminum oxide, zirconium hydroxide, or silicon dioxide, or mixtures thereof, impregnated with chlorides, sulfates or mixtures thereof of iron, zinc or copper or mixtures thereof.

The filtration media contained within each panel filter element may be a single filtration media, or a mixture of dissimilar filtration media, or layers of filtration media. For example, if hydrogen cyanide and ammonia filtration are desired, an individual panel filter element may include a layer of activated, impregnated carbon and a layer of an ammonia removal media. Alternatively, a panel filter element may include a mixture of ammonia removal media and activated, impregnated carbon.

The disclosed filter may be employed in a variety of applications and configurations where a low pressure drop and/or low volume solution to air purification is required. In some applications the filter may be arranged in ducting to provide purified air to a room or series of rooms. Said example would be used to treat air flow rates of as low as less than 200 SCFM up to greater than about 1,200 SCFM. In this example, a section of the ducting may be removed and replaced with the filter device as described herein to remove toxic and/or hazardous compounds from the air stream. The section removed can be as small as a less than two feet to greater than 5 feet in length, depending on the flow rate of air and the pressure drop tolerance of the existing air handling system. The panel filter elements will divide amongst them sufficient filtration media to achieve the necessary level of air purification. As such, the residence time corresponding to the flow of air through each panel filter element may range from as little as less than 0.01 seconds to greater than 1 second, with a residence time between 0.1 and 0.3 seconds being preferred. Vanes may be included in the spacing between the panel filter elements to enhance flow distribution. A HEPA filter may be integrated into the panel filter to provide particulate removal, if required. An improved system and process will allow for removable panel filter elements.

In some embodiments, the filter device can be located upstream, downstream, or inline with an air handling system designed to deliver air to an entire structure, e.g., a building, ship or aircraft. Such configuration can be used, for example, to treat air flow rates of as low as less than about 1,200 SCFM up to greater than about 20,000 SCFM. In this example, as few as 2 and as many as 10 or more panel filter elements may be arranged in a filter housing sized to accommodate the panel filter elements. In some embodiments, structures that obstruct the air flow (without completely blocking the air flow), for example vanes, may be formed or arranged in the air flow channels between adjacent panel filter elements to improve flow distribution through the panel filter elements. The filter may include a flow distribution plate at the upstream end (input end) of the housing. In some embodiments the filter may include both vanes and an input end distributor plate. The panel filter elements may collectively include sufficient filtration media to achieve a desired level of air purification. In some embodiments, the panel filter elements may provide a residence time, representing the time for the air flow to pass through each panel filter element, in the range of 0.01 seconds to 1 second (or in some embodiments, greater than 1 second), preferably in the range between 0.1 and 0.3 seconds. In some embodiments a HEPA filter may be integrated in the panel filter to provide desired particulate removal. In addition, the filter may allow for easy removal and replacement of the panel filter elements.

In still another application, the disclosed filter may be employed in a stand-alone configuration to provide breathable air to a portable shelter or breathing apparatus, for example. Said example would be used to treat air flow rates of as low as less than about 10 SCFM up to greater than about 200 SCFM. In this example, as few as 2 and as many as 6 or more panel filter elements will be located within a housing of a size necessary to accommodate the panel filter elements. The filter housing may include an integrated blower or other air moving device, vanes or other air flow obstructing structures located between the voids of the panel filter elements to improve flow distribution, and/or a flow distribution plate located at the inlet end (upstream end) of the filter, and/or any combination of the above. The panel filters may collectively include sufficient filtration media to achieve a desired or defined target level of air purification. As such, the residence time corresponding to the flow of air through each panel filter element may range from as little as less than 0.01 seconds to 1 second or more, for example a preferred residence time of 0.1 and 0.3 seconds in some applications. A HEPA filter may be integrated into the panel filter to provide particulate removal, if required. The filter may be designed to allow for readily removal and replacement of individual panel filters or individual panel filter elements.

Figure 1:
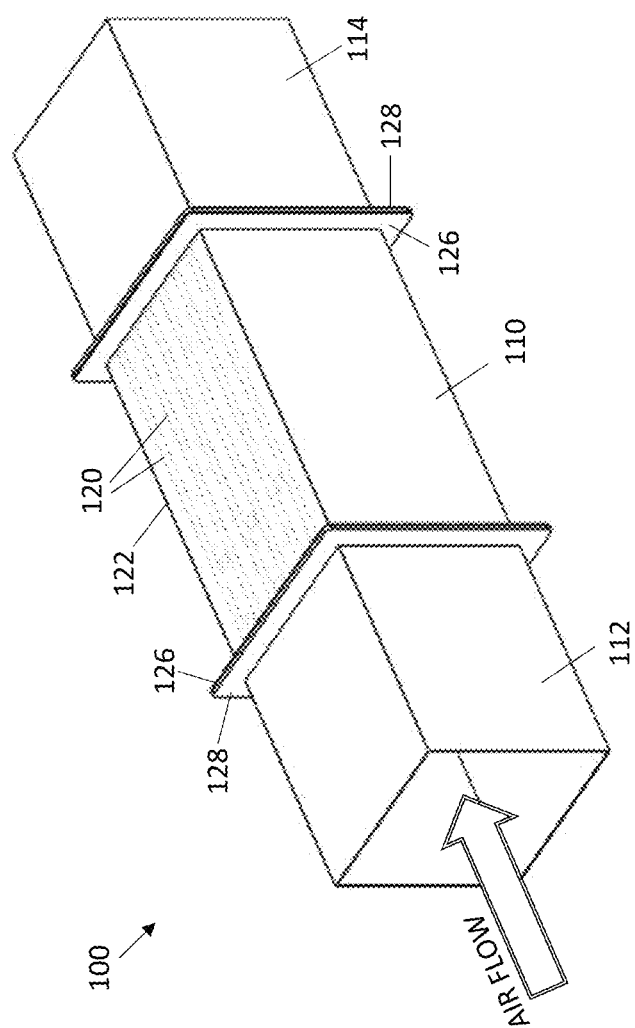
FIG. 1 is an example air handling system including an inventive filter inserted inline, according to example embodiments of the invention.

FIG. 1 shows an example air handling system 100 including an inventive air filter 110 inserted inline, according to example embodiments of the invention. As shown, an air filter 110 according to the present disclosure may be arranged inline between duct sections 112 and 114 of an air handling system. For example, an air filter 110 may be arranged inline between duct sections 112 and 114 of an existing, conventional air handling system. In some embodiments, a section of existing ducting may be cut out and air filter 110 inserted in the cut-out section and secured to the ductwork on both sides (i.e., duct sections 112 and 114 shown in FIG. 1) using any suitable connection devices or any suitable connection techniques.

In the example embodiment shown in FIG. 1, air filter 110 includes a housing 122 a flange or other connection structure 126 at the inlet end 133 and outlet end 135 of the filter 110 configured for connection to corresponding flanges or other connection structures 128 provided on duct sections 112 and 114. Gaskets may be arranged at the connections between filter housing 112 and duct section 112 and 114, to provide a sealed connection.

As discussed below, filter 110 may include multiple panel filters 120 arranged the housing and extending at least near-parallel to the air flow direction, and air flow redirecting structures configured to force the air flow through the panel filters 120. Each panel filter 120 may include a single filter element or multiple filter elements, e.g., arranged side-by-side in a stacked arrangement, as discussed below with reference to FIG. 7.

Figure 2:
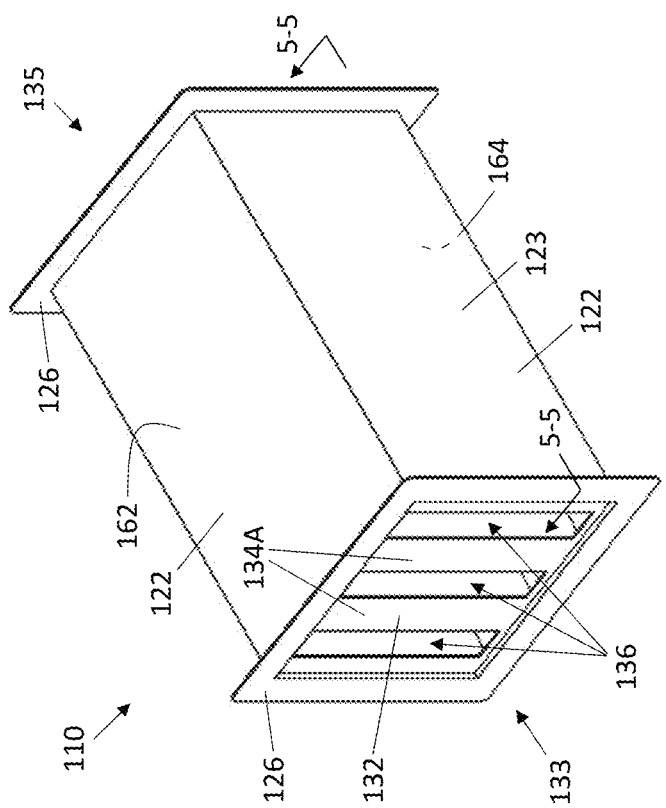
FIG. 2 is a three-dimensional view of a filter for use in the example air handling system of FIG. 1, according to one example embodiment of the invention.

FIG. 2 is a three-dimensional view of the filter 110 arranged in the example air handling system 100 shown in FIG. 1, according to one example embodiment. As shown, filter housing 122 has a rectangular prism shape including a pair of sidewalls 123 arranged between a top wall 162 and a bottom wall 164. In other embodiments, the housing 122 may have other shapes, e.g., an elongated cylindrical shape, trapezoidal prism shape, or any other suitable shape. The housing 122 is configured to receive an air flow at an inlet end 133, pass the air flow through a set of panel filters 120, and output the filtered gas flow through an outlet end 135. Filter 110 may include a distribution plate 132 at the inlet end 133, which includes inlet openings 136 separated by air flow blocking structure 134A. Each inlet opening 136 opens into an inlet channel, and each as air flow blocking structure 134A blocks an upstream end of an outlet channel, as shown in FIGS. 5-9 discussed below.

Figure 3:
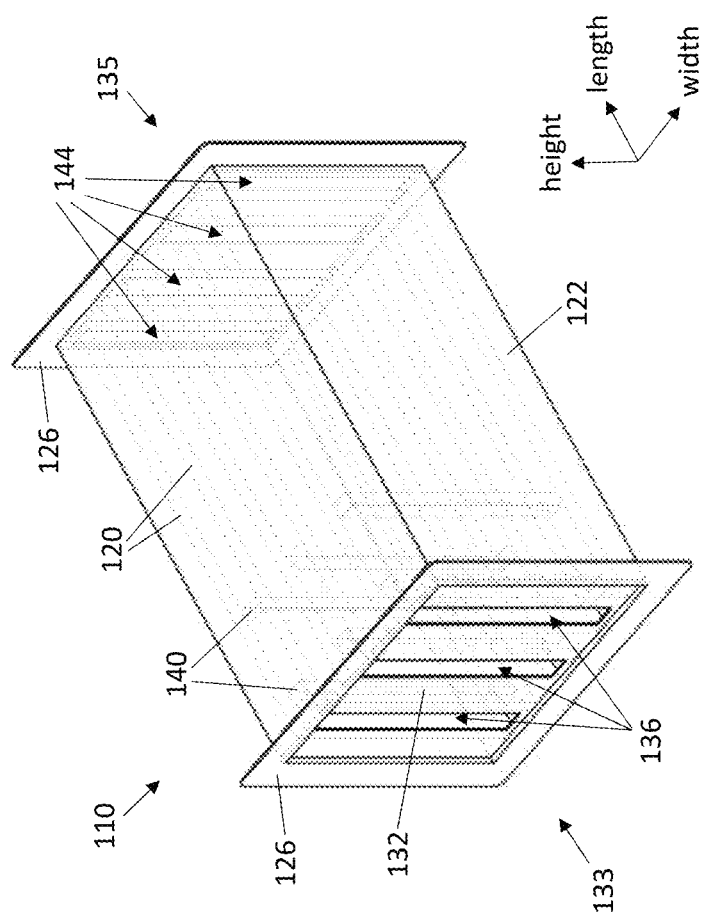
FIG. 3 is a three-dimensional view of the filter of FIG. 2, wherein the housing is shown as partially transparent to show internal structures of the filter, according to one example embodiment of the invention.

FIG. 3 is a three-dimensional view of filter 110 shown in FIG. 2, wherein the housing 122 is shown as partially transparent to show internal structures of filter 110, according to one example embodiment of the invention. In particular, the partially transparent housing 122 shows a plurality of panel filters 120 arranged in parallel to the air flow direction (and to each other), and separated from each other to define an air flow channel between each adjacent pair of panel filters 120, as discussed below. An air flow is received through a number of spaced-apart inlet openings 136 (defined by distribution plate 132) at the inlet end 133, passes through the filter plates 120, and exits the filter 110 through a number of spaced-apart outlet openings 144 at the outlet end 135 of filter 110.

FIG. 3 also shows a number of air flow obstructing structures (e.g., vanes) 140 arranged in selected air flow channels to promote air flow through the panel filters 120 at selected locations along the length of filter 110.

Figure 4:
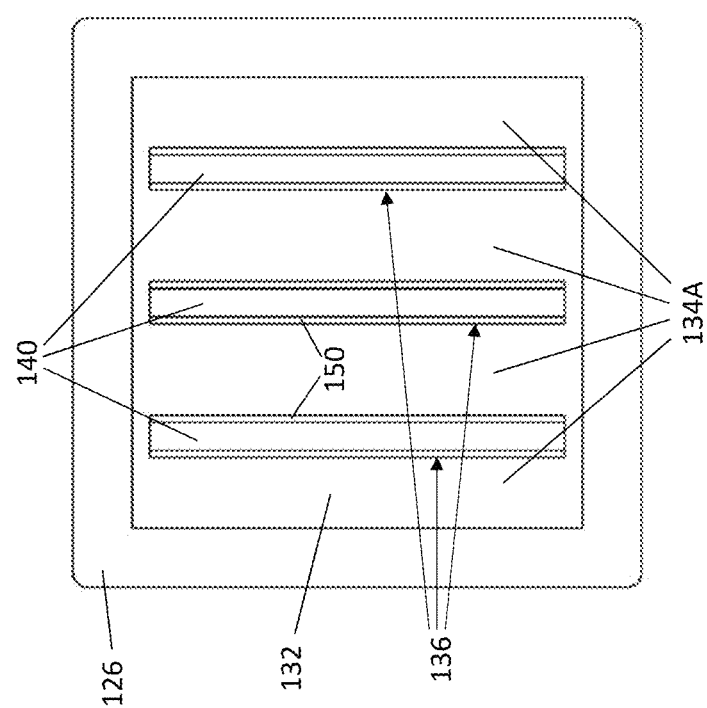
FIG. 4 shows a distributor plate at an inlet end of the filter, according to one example embodiment of the invention.

FIG. 4 shows an example distributor plate 132 at the inlet end 133 of filter 110, according to one example embodiment. Distributor plate 132 defines a number of inlet openings 136, each leading to a respective inlet channel 150 (as shown in FIG. 5, discussed below) separated by a number of air flow blocking structures 134A (each blocking an upstream end of an outlet channel, as shown in FIG. 5, discussed below). An air flow obstructing structure (e.g., vane) 140 can be seen in each inlet channel 150. Each air flow obstructing structure 140 is configured to partially obstruct an air flow in the respective inlet channel 150, as shown in FIG. 5 discussed below. As shown, each air flow obstructing structure 140 may extend across a partial width of the respective inlet channel 150, to impede but not completely block the air flow through the inlet channel 150.

As discussed above, panel filters 120 may be parallel (e.g., FIGS. 5-7 discussed below) or near-parallel (e.g., FIGS. 8-9 discussed below) to the main air flow direction, or to the side walls of the filter housing 122. A panel filter 120 is "parallel" to the main air flow direction, or to a sidewall 123 of the filter housing 122, if a frontal surface plane $S_{front}$ of the panel filter 120 is parallel to the main air flow direction (or housing sidewall 123), e.g., to within 0.5 degree or 1 degree. A panel filter 120 is "near-parallel" to the main air flow direction, or to a housing sidewall 123, if the frontal surface plane $S_{front}$ of the panel filter 120 is arranged non-parallel but offset from the main air flow direction (or housing sidewall 123) by less than a defined degree of angular offset, e.g., less than 7 degrees, less than 5 degrees, or less than 2 degrees, depending on the particular embodiment. The frontal surface plane $S_{front}$ of a panel filter 120 is the plane of the major surface of the panel filter 120 through which the air flow is redirected (i.e., through the filter bed thickness). In some embodiments, the angular alignment of each panel filter 120 (e.g., parallel or near-parallel to the main air flow direction and/or filter housing sidewall 123) may be defined by a slot, rail, or other alignment structure configured to hold the panel filter 120 in a defined alignment, e.g., the rails 160 shown in FIG. 6 or rails 161 shown in FIG. 9, discussed below.

FIG. 5 is a three-dimensional cross-sectional view of filter 110, taken through cut lines 5-5 shown in FIG. 2, showing internal structures of filter 110, according to one example embodiment of the invention. In this example, six panel filters 120 are arranged in a parallel arrangement in the filter housing 122. However, it should be understood that filter 110 may include any other number of panel filters, for example, two, three, four, five, seven, eight, nine, ten, eleven, twelve, or more, wherein each panel filter includes one, two, three, four, or more panel filter elements.

As shown, a frontal surface plane $S_{front}$ of each panel filter 120 is arranged parallel to the main air flow direction and to the housing sidewalls 123. The panel filters 120 are spaced apart to define a series of air flow channels between adjacent panel filters 120 (and between the outermost panel filters 120 and a respective side wall of housing 122). Air flow blocking structures 134A at the inlet end 133, along with air flow blocking structures 134B at the outlet end 135, define each air flow channel as either (a) an inlet channel 150 that receives air flow from a respective inlet opening or (b) an outlet channel 152 terminating at a respective outlet opening 144 for outputting filtered air flow, wherein the inlet channels 150 and outlet channels 152 alternate with each other.

As shown in FIG. 5, each inlet opening 136 leads to an inlet channel 150, which is blocked at the downstream end by a respective air flow blocking structure 134B. Thus, air flow in each inlet channel 150 is forced laterally through the panel filters 120 on each side of the respective inlet channel 150, and into the adjacent outlet channels 152, allowing the filtered air to flow out through the outlet openings 144 at the end of each outlet channel 152.

In addition, the air flow obstructing structures 140 may impede the air flow in each inlet channel 150, to increase the redirected air flow through panel filters 120 at locations upstream or near each air flow obstructing structure 140. In some embodiments, air flow obstructing structures 140 may be arranged at one or more locations along the length of each inlet channel 150, to thereby increase the distribution of air flow through panel filters 120 along the length of the panel filters 120.

FIG. 6 shows a top view of filter 110 shown in FIG. 5, showing air flow along inlet channels 150, redirected laterally through panel filters 120 and into adjacent outlet channels 152, and out through outlet openings 144, according to one example embodiment. Thus, the configuration of panel filters 120, air flow blocking structures 134A and 134B, and air flow obstructing structures 140 cooperate to redirect the air flow in inlet channels 150 to turn (e.g., right angle turn) and pass through the panel filters 120, resulting in contact between the air flow stream and the filtration media contained within the panel filters 120. Upon exiting the panel filters 120, the air flow makes another turn (e.g., right angle turn) to travel down outlet channels 152 and out of the filter 110 through outlet openings 144. The pressure drop through each panel filter 120 may be similar, such that the flow is divided substantially evenly among the panel filters 120. The arrangement of the panel filters 120 may define a high geometric (frontal) surface area, many times greater than of a traditional fixed bed adsorber or that of a radial flow filter comprised of the same volume of filtration media. The high geometric surface area of the panel filters 120, combined with the reduced thickness of the filter beds, may result in a relatively low pressure drop, as discussed above.

Filter housing 122 may include panel alignment structures configured to hold each panel filter in a defined position or alignment, e.g., parallel or near-parallel to the main air flow direction and/or filter housing sidewall. For example, in the embodiment shown in FIG. 6, filter housing 122 includes panel alignment rails 160 (shown in FIG. 6) extending upwardly from the bottom side 164 (e.g., by a distance of less than 1 inch) of the housing and similar panel alignment rails (not shown) extending downwardly from the top side 162 of the housing (e.g., by a distance of less than 1 inch). In the embodiment shown in FIG. 6, panel filters 120 may be removed (e.g., for replacement of used panel filters) by (a) removing the front distribution plate 134 and (b) sliding each panel filter 120 out through the inlet side 133 of the filter 110 along the respective alignment rails 160.

FIG. 7 shows a top view of another embodiment of the filter, indicated at 110A, in which each panel filter 120 includes a stack of multiple different panel filter elements, according to one example embodiment of the invention. In this illustrated example, each panel filter 120 includes a stack of two different panel filter elements 120A and 120B, which may contain different filtering media, e.g., for filtering different types of contaminants, or different sizes of contaminant particles. In other embodiments, each panel filter 120 may include a stack of any other number of different panel filter elements, e.g., three, four, or more elements stacked together.

FIG. 8 is a three-dimensional cross-sectional view (through cut lines 5-5 shown in FIG. 2) of another embodiment of the filter, indicated at 110B, in which the panel filters 120 are arranged near-parallel to the main air flow direction, or to the filter housing side walls 123, according to one example embodiment of the invention. For example, a frontal surface plane $S_{front}$ of each panel filter 120 (or at least a subset of panel filters 120) may be arranged offset from the main air flow direction (and/or housing side walls 123) by an angular offset in the range of 0.5-7 degrees, 0.5-5 degrees, or 0.5-2 degrees.

FIG. 9 shows a top view of the example filter 110B shown in FIG. 8. As shown in FIG. 9, panel filters 120 are each angularly offset from the main air flow direction (and housing side walls 123) by an angle α, which may be in the range of 0.5-7 degrees, 0.5-5 degrees, or 0.5-2 degrees, depending on the particular embodiment. As shown in FIGS. 8 and 9, adjacent pairs of panel filters 120 define tapered inlet channels 150, which decrease in width from inlet end 133 to outlet end 135. Filter housing 122 may include panel alignment rails 161 extending upwardly from the bottom side (e.g., by a distance of less than 1 inch) of the housing and similar panel alignment rails extending downwardly from the top side of the housing (e.g., by a distance of less than 1 inch), for holding each panel filter 120 in its respective alignment.

EXAMPLES

Example 1

Comparative (Prior Art)

Into a test fixture with a 10 in tall by 12 inch wide frontal area (inlet duct size) was loaded a bed of 12×30 mesh (12 mesh=1.68, 30=0.6 mm) activated carbon impregnated with salts of copper, zinc, molybdenum, silver and further loaded with triethylene diamine (filtration media). The resulting single, fixed bed of filtration media was 9.75 inches deep and contained 0.67 ft3 of filtration media. The geometric surface area of the bed is only 0.83 ft2. The activated, impregnated carbon was obtained from Calgon Carbon Corporation as product ASZM-T. The pressure drop through the bed was 3.8 psig (slightly more than 100 inches of water) when challenged with flowing, humid air at 200 SCFM. The bed was challenged with 1,500 ppm sulfur dioxide (SO2). The breakthrough time, defined as the time in which the effluent concentration of SO2 exceeded 10 ppm, was 22 minutes.

The above test was repeated by challenging the bed with 3,000 ppm hydrogen sulfide (H2S). The H2S breakthrough time, defined as the time in which the effluent concentration of H2S exceed 5 ppm, as 20 minutes.

The above test was repeated by challenging the bed with 2,500 ppm cyclohexane (C6H12). The cyclohexane breakthrough time, defined as the time in which the effluent concentration of cyclohexane exceed 10 ppm, as 33 minutes.

Although the fixed bed of filtration media is able to remove the toxic and/or hazardous compounds, the pressure drop is highly excessive and would require significant upgrades to the air handling installation.

Example Implementations of Embodiments of the Present Invention

Example 2

Into a test fixture with a 10 in tall by 12 inch wide frontal area was loaded two panel filter elements containing 12×30 mesh activated carbon impregnated with salts of copper, zinc, molybdenum, silver and further loaded with triethylene diamine (filtration media). The activated, impregnated carbon was obtained from Calgon Carbon Corporation as product ASZM-T. Each panel filter element was 10 inches tall, 36 inches long with a bed depth of 1.6 inches. Each element contained 0.33 ft3 of filtration media for a total of 0.67 ft3 of filtration media. The geometric surface area of the panel filter elements is 5.0 ft2. The pressure drop through the bed was 1.8 iwg when challenged with flowing, humid air at 200 SCFM. Said pressure drop is significantly less than that recorded for the single, fixed bed containing the same amount of filtration media. The bed was challenged with 1,500 ppm sulfur dioxide (SO2). The breakthrough time, defined as the time in which the effluent concentration of SO2 exceeded 10 ppm, was 21 minutes. Said example illustrates that by increasing the geometric surface area of the filter bed coupled with the corresponding decrease in the bed depth greatly reduces the pressure drop while not affecting filtration performance.

Example 3

Into a test fixture with a 10 in tall by 12 inch wide frontal area was loaded four panel filter elements containing 12×30 mesh activated carbon impregnated with salts of copper, zinc, molybdenum, silver and further loaded with triethylene diamine (filtration media). The activated, impregnated carbon was obtained from Calgon Carbon Corporation as product ASZM-T. Each panel filter element was 10 inches tall, 36 inches long with a bed depth of 0.8 inches. Each element contained 0.17 ft3 of filtration media for a total of 0.67 ft3 of filtration media. The geometric surface area of the panel filter elements is 10.0 ft2. The pressure drop through the bed was 0.3 iwg when challenged with flowing, humid air at 200 SCFM. Said pressure drop is significantly less than that recorded for the single, fixed bed containing the same amount of filtration media. The bed was challenged with 1,500 ppm sulfur dioxide (SO2). The breakthrough time, defined as the time in which the effluent concentration of SO2 exceeded 10 ppm, was 23 minutes.

The above test was repeated by challenging the bed with 3,000 ppm hydrogen sulfide (H2S). The H2S breakthrough time, defined as the time in which the effluent concentration of H2S exceed 5 ppm, as 20 minutes.

The above test was repeated by challenging the bed with 2,500 ppm cyclohexane (C6H12). The cyclohexane breakthrough time, defined as the time in which the effluent concentration of cyclohexane exceed 10 ppm, as 26 minutes.

Said example illustrates that by increasing the geometric surface area of the filter bed coupled with the corresponding decrease in the bed depth greatly reduces the pressure drop while not having a significant impact on chemical filtration.

Example 4

Into a test fixture with a 10 in tall by 12 inch wide frontal area was loaded four panel filter elements containing 12×30 mesh zirconium hydroxide impregnated with zinc chloride. Each panel filter element was 10 inches tall, 36 inches long with a bed depth of 0.8 inches. Each element contained 0.17 ft3 of filtration media for a total of 0.67 ft3 of filtration media. The geometric surface area of the panel filter elements is 10.0 ft2. The pressure drop through the bed was 0.3 iwg when challenged with flowing, humid air at 200 SCFM. Said pressure drop is significantly less than that recorded for the single, fixed bed containing the same amount of filtration media. The bed was challenged with 1,500 ppm ammonia (NH3). The breakthrough time, defined as the time in which the effluent concentration of NH3 exceeded 35 ppm, was 160 minutes.

Example 5

Into a test fixture with a 10 in tall by 12 inch wide frontal area was loaded four panel filter elements containing 12×30 mesh zirconium hydroxide impregnated with zinc chloride. Each panel filter element was 10 inches tall, 18 inches long with a bed depth of 1.6 inches. Each element contained 0.17 ft3 of filtration media for a total of 0.67 ft3 of filtration media. The geometric surface area of the panel filter elements is 5.0 ft2. The pressure drop through the bed was 1.8 iwg when challenged with flowing, humid air at 200 SCFM. Said pressure drop is significantly less than that recorded for the single, fixed bed containing the same amount of filtration media. For the present configuration, greater than 50% of the volume occupied by the filter is filtration media. The bed was challenged with 1,500 ppm ammonia (NH3). The breakthrough time, defined as the time in which the effluent concentration of NH3 exceeded 35 ppm, was 160 minutes.

The invention claimed is:

1. A filter for removing contaminants from a gas flow, the filter comprising:
   a filter housing extending along a main gas flow direction from an inlet end of the filter to an outlet end of the filter;
   a plurality of panel filters arranged in the filter housing and spaced apart from each other to define a plurality of elongated gas flow channels extending generally in the main gas flow direction;
   wherein the plurality of elongated gas flow channels includes at least one inlet channel arranged in an alternating manner with at least one outlet channel, the at least one inlet channel configured to receive the gas flow at the inlet end of the filter and the at least one outlet channel configured to output a filtered gas flow from the outlet end of the filter;
   a gas flow blocking structure, at a downstream end of a respective inlet channel of the at least one inlet channel, to block the gas flow through the downstream end of the respective inlet channel; and
   a gas flow obstructing structure, located in the respective inlet channel at a location upstream of the gas flow blocking structure, to redirect a first portion of the gas flow in the respective inlet channel through at least one adjacent panel filter and allow a second portion of the gas flow to pass toward the downstream end of the respective inlet channel.

2. The filter of claim 1, wherein each panel filter includes multiple types of media contained in a panel filter housing.

3. The filter of claim 1, wherein each panel filter include includes at least two panel filter elements stacked side-by-side.

4. The filter of claim 1, wherein the respective gas flow obstructing structure upstream of the gas flow blocking structure partially blocks the gas flow through the respective inlet channel.

5. The filter of claim 1, wherein each panel filter is arranged parallel to the main gas flow direction.

6. The filter of claim 1, wherein each panel filter is arranged near-parallel, at an offset angle of less than 7 degrees, to the main gas flow direction.

7. The filter of claim 1, wherein each panel filter is arranged near-parallel, at an offset angle of less than 2 degrees, to the main gas flow direction.

8. The filter of claim 6, wherein an adjacent pair of the panel filters are arranged such that a respective inlet channel defined between the pair of panel filters has a width that decreases from the inlet end of the filter to the outlet end of the filter.

9. The filter of claim 1, wherein at least one of the panel filters includes activated carbon.

10. The filter of claim 1, wherein at least one of the panel filters includes activated, impregnated carbon.

11. The filter of claim 1, wherein the filter provides a pressure drop of the gas flow of less than 3 iwg (inches of water gauge pressure).

12. The filter of claim 1, wherein the filter provides a pressure drop of the gas flow of less than 1 iwg (inches of water gauge pressure).

13. The filter of claim 1, wherein the filter provides a pressure drop of the gas flow of less than 0.3 iwg (inches of water gauge pressure).

14. The filter of claim 1, wherein a thickness of each panel filter, in a direction perpendicular to the main gas flow direction, is less than or equal to 3 inches.

15. The filter of claim 1, wherein a thickness of each panel filter, in a direction perpendicular to the main gas flow direction, is less than or equal to 1 inch.

16. The filter of claim 1, wherein the panel filters are constructed such that a residence time of the gas flow through each panel filter element is between 0.01 seconds and 1 second.

17. The filter of claim 1, wherein the panel filters are constructed such that a residence time of the gas flow through each panel filter element is between 0.1 and 0.3 seconds.

18. The filter of claim 1, wherein each panel filter comprises an integrated high efficiency particulate air (HEPA) filter.

19. The filter of claim 1, wherein the gas flow comprises an air flow, and the filter is configured to remove contaminants selected from the group consisting of traditional chemical warfare (CW) agents, toxic industrial chemicals (TICs), and hazardous air pollutants (HAPs).

20. A filter for removing contaminants from a gas flow, the filter comprising:
   a filter housing extending along a main gas flow direction from an inlet end of the filter to an outlet end of the filter;
   a plurality of panel filters arranged in the filter housing and spaced apart from each other to define a plurality of elongated gas flow channels extending generally in the main gas flow direction;

wherein the plurality of elongated gas flow channels includes at least one inlet channel arranged in an alternating manner with at least one outlet channel, the at least one inlet channel configured to receive the gas flow at the inlet end of the filter and the at least one outlet channel configured to output a filtered gas flow from the outlet end of the filter;

a gas flow blocking structure defining a downstream end of a respective inlet channel of the at least one inlet channel, the gas flow blocking structure fully blocking the gas flow through the downstream end of the respective inlet channel; and a gas flow obstructing structure upstream of the gas flow blocking structure, the gas flow obstructing structure extending partially across a width of the respective inlet channel to obstruct the gas flow through the respective inlet channel;

wherein the gas flow blocking structure and the gas flow obstructing structure cooperate to redirect the gas flow in the respective inlet channel through at least one panel filter and into at least one adjacent outlet channel.

21. The filter of claim 1, wherein each panel filter is arranged parallel to, or at an offset angle of less than 7 degrees from, the main gas flow direction.

* * * * *